Aug. 15, 1967   H. W. ROORDA   3,335,711
EASY STARTING COMPRESSION RELEASE VALVE
Filed April 13, 1965

INVENTOR.
HARRY W. ROORDA
BY
Wheeler, Wheeler & Wheeler
ATTORNEYS

United States Patent Office 3,335,711
Patented Aug. 15, 1967

3,335,711
EASY STARTING COMPRESSION RELEASE VALVE
Harry W. Roorda, Waukesha, Wis., assignor to Wisconsin Motor Corporation, Milwaukee, Wis., a corporation of Wisconsin
Filed Aug. 13, 1965, Ser. No. 479,441
4 Claims. (Cl. 123—182)

This invention relates to compression release valves and, more particularly, to compression release valves for internal combustion engines.

An important object of the invention is to provide a compression release valve for an internal combustion engine, which valve can be manually opened prior to starting the engine to afford reduction of compression in the engine to thereby assist in starting the engine, and which automatically closes upon the first firing stroke of the engine and which remains closed during operation of the engine.

Another object of the invention is to provide a compression release valve which affords a reduction of compression in the combustion chamber of an engine to a point sufficiently low to afford easy cranking of the engine, but still high enough to allow ignition of the combustion charge in the combustion chamber of the engine.

My compression release valve is mounted on an engine in communication with the combustion chamber thereof and has a valve body with a central bore. A valve stem is disposed in the bore and has a plug movable between an open and a closed position. Upon opening of the valve plug, the engine combustion chamber is vented to the atmosphere through an orifice of controlled diameter disposed in the valve body. Control means are provided for affording a predetermined resistance to opening and closing of the valve member whereby upon opening of the valve the compression in the engine is reduced to a predetermined point and whereby the valve automatically closes on the first firing stroke of the engine and remains closed during operation of the engine.

Other objects and advantages will become apparent from the following description and accompanying drawings in which.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
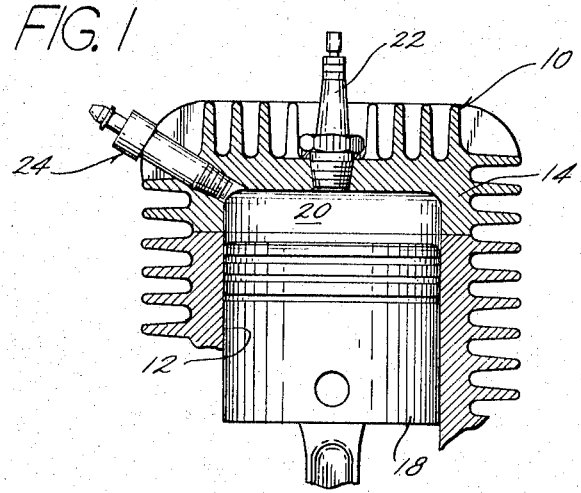
FIGURE 1 is a fragmentary, axial sectional view of an engine cylinder incorporating a compression release valve of the invention.
Figure 2:
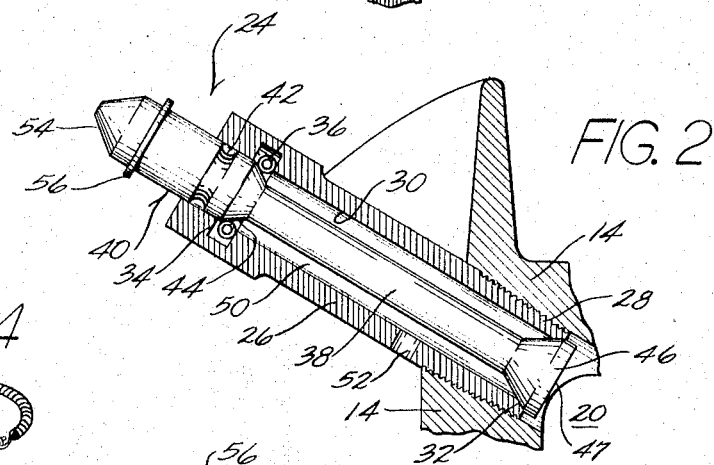
FIGURE 2 is an enlarged, sectional view of the compression release valve shown in FIGURE 1 and showing the valve in a closed position.

Referring now to the drawings and more particularly to FIGURE 1, the engine 10 includes a cylinder 12 having a head 14. Cylinder 12 receives a piston 18 movable therein. A combustion air-fuel mixture is admitted to a combustion chamber 20 in a conventional manner and ignited by a spark plug 22.

A compression release valve 24 is carried on the engine 10 in communication with the combustion chamber 20. The compression release valve 24 includes a cylindrical valve body 26 having a threaded end 28 adapted for threaded attachment to the engine cylinder head 14 in communication with the combustion chamber 20. The valve body is provided with a central bore 30 which terminates in a tapered valve seat 32 at the threaded end 28 thereof. At its opposite end valve body is provided with an inwardly facing annular groove 34 receiving therein a garter ring spring 36.

Valve 24 has a stem 38 movable in the bore 30 for movement of its tapered valve plug 46 between an open and closed position respectiing seat 32. Control means are provided for selectively retaining the tapered valve plug 46 in either the open or closed positions, for affording a predetermined resistance to the opening and closing thereof and whereby the valve 24 automatically closes on the first firing stroke of the engine 10 and remains closed during operation of the engine 10. A vent 52 is also provided whereby upon opening of the valve plug 46, the compression in the engine is reduced to a predetermined level.

Figure 3:
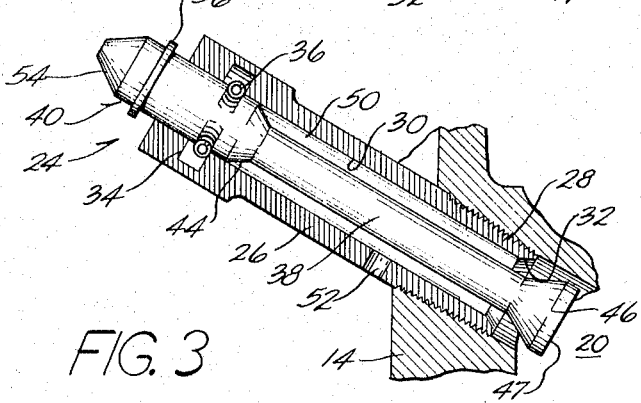
FIGURE 3 is a view similar to FIGURE 2 showing the valve in open position.

In the preferred embodiment such control means includes the garter ring spring 36, an outwardly facing annular groove 42 on stem 38 and into which the garter ring spring 36 snaps when the valve plug 46 is moved to the open position (as shown in FIGURE 3) and a cam surface 44 on stem 38 which is axially spaced from groove 42. The groove 42 has curved cam walls. In the open position of the valve plug 46 (FIGURE 3), the garter ring spring 36 contracts into the groove 42 with a predetermined force affording a predetermined resistance to axial movement of stem 38 and closing the valve plug 46. The resistance to closing afforded by the spring 36 is chosen in relation to the combustion pressures in the engine whereby the valve plug 46 will automatically close upon the first firing stroke of the engine 10.

The cam surface 44 constitutes a bevel shoulder between stem 38 and push button 40. The shoulder 44 is engaged by the garter ring spring 36 when the valve plug 46 is in its closed position. The garter ring spring 36 contracts against the cam surface 44 with a predetermined force to afford a sufficient resistance to opening of the valve plug 46 so as to prevent the valve 24 from opening on the suction stroke of the engine 10. Further, the taper of the cam surface 44 affords a gradually increasing resistance to opening of the valve 24 as the cam surface 44 progressively spreads the spring 36 during movement of the valve plug 46 toward the open position. Spring 36 functions as a cam follower biased toward engagement with the cam surfaces 42, 44 to yieldably hold the plug selectively in open or closed position. Valve plug 46 is provided with a generally flat end surface 47 on which the various combustion chamber pressures act to provide forces tending to open and close the valve 24.

Stem 38 is smaller in cross section than bore 30; the space therebetween constituting a gas-flow chamber or passageway 50. Bore 30 is provided with the vent orifice 52.

Vent orifice 52 is of predetermined diameter to restrict gas flow therethrough so as not to reduce the compression ratio of the engine below a certain level when the valve 24 is open. In particular, the orifice 52 is dimensioned to prevent reduction of compression in the engine 10 to below a point necessary for ignition of the combustion charge, but low enough to allow easy engine cranking. With the valve 24 open, the engine 10 can still build up a sufficient compression in the combustion chamber 20 to allow ignition of the combustion charge and easy starting. In a practical embodiment of the invention having a three-inch diameter cylinder, orifice 52 is .075" in diameter.

Push button 40 has a tip 54 projecting from the valve body for manually opening the valve 24 as by depressing the button 40. The button 40 is provided with a stop 56 to limit its inward movement.

In operation, when starting an engine employing the compression release valve 24 of the invention, the button 40 is depressed whereupon its plug 46 is unseated from the valve seat 32 to vent chamber 20 to the atmosphere through orifice 52. This allows gas to escape at a predetermined rate from the combustion chamber 20 during the compression stroke of the engine 10, thereby reducing the compression ratio to a predetermined point and allows gas to enter the combustion chamber 20 on the suction stroke of the engine 10 to thereby afford easy cranking and quick starting of the engine 10. In a practical embodiment of the invention, the normal compression ratio is 6–1. With valve 24 open, the compression ratio is reduced to a lesser value, depending on cranking speed. The first firing stroke of the piston will close the valve 24, thus restoring the compression ratio to full value.

Engines embodying the inventions will typically be single-cylinder engines. In multi-cylinder engines, each cylinder will desirably have a valve 24. These will be manually actuated independently, although they may be coupled together for joint actuation.

Figure 4:
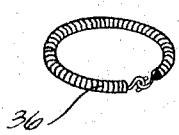
FIGURE 4 is a perspective view of the garter ring spring.

As best shown in FIGURE 4, the garter ring spring 36 desirably comprises a series of coils wound in a helix, the ends of which have hooks interengaged to hold the spring in its ring shape.

Various of the features of the invention are set forth in the following claims:

What is claimed is:

1. A compression release valve for an internal combustion engine, said valve comprising a valve body having a central bore, a valve having a plug movable between an open and closed position respecting said bore, and control means for affording a predetermined resistance to opening and closing of said valve whereby opening of said valve reduces the engine compression to a predetermined level and whereby said valve automatically closes on the first firing stroke of said engine and remains closed during operation of the engine, said control means including an inwardly facing annular groove on the valve body, a stem for the plug having a cam surface and an outwardly facing annular groove spaced from said cam surface, and a garter ring spring carried in said annular groove of said valve body for engaging said annular groove of said valve stem when said valve is in the open position to thereby afford a predetermined resistance to closing said valve and for engaging said cam surface when said valve is in the closed position to thereby afford a predetermined resistance to opening of said valve.

2. A compression release valve for use with an internal combustion engine, said valve comprising a valve body having a central bore terminating at one end in a valve seat and having a threaded end for mounting said valve on an engine in communication with the engine combustion chamber, said valve body also having an inwardly facing annular groove in said bore, a garter ring spring disposed in said annular groove, a valve member disposed in said bore and having a plug movable between open and closed positions to selectively afford compression reduction in the combustion chamber of the engine, said valve member having an inclined cam surface for engaging said garter ring spring to afford a predetermined resistance to movement of said valve from said closed position to said open position, and having an outwardly facing annular groove spaced from said cam surface for receiving said ring spring when said valve is in said open position to afford a predetermined resistance to closing said valve, said valve member also having a stem of reduced diameter cooperating with said valve body to define a gas-flow chamber between said stem and said valve body, and an inlet in said valve body communicating with said chamber to afford communication of the engine combustion chamber with the atmosphere when said valve is in said open position, whereby when said valve is in said open position, compression is reduced in the engine combustion chamber and whereby when the engine first fires, said valve automatically closes and remains closed during operation of the engine.

3. A compression release valve in accordance with claim 2 wherein said inlet is dimensioned to allow gas flow therethrough sufficient to reduce the engine compression to a point affording easy cranking of said engine and affording sufficient compression to allow starting of said engine.

4. An easy starting internal combustion engine comprising a cylinder having a combustion chamber, a compression release valve connected to said chamber and having a push button, a stem, a valve plug actuated by said stem, a vent to restrict gas flow through the valve when the plug is open, and control means for yieldably holding the plug selectively in open and closed positions, said control means comprising axially spaced cam surfaces on said stem and a garter spring contractable against said cam surfaces and expandable away therefrom on axial movement of the stem.

References Cited

FOREIGN PATENTS 416,342    9/1934    Great Britain.

MARK NEWMAN, *Primary Examiner.*

RALPH D. BLAKESLEE, *Examiner.*